US012563235B2

(12) United States Patent
Sánchez De La Fuente et al.

(10) Patent No.: US 12,563,235 B2
(45) Date of Patent: Feb. 24, 2026

(54) CONFIGURABLE NAL AND SLICE CODE POINT MECHANISM FOR STREAM MERGING

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/734,094

(22) Filed: Jun. 5, 2024

(65) Prior Publication Data

US 2024/0406455 A1     Dec. 5, 2024

Related U.S. Application Data

(63) Continuation of application No. 17/639,761, filed as application No. PCT/EP2020/074619 on Sep. 3, 2020, now Pat. No. 12,028,552.

(30) Foreign Application Priority Data

Sep. 3, 2019    (EP) ..................................... 19195198

(51) Int. Cl.
    *H04N 19/172*       (2014.01)
    *H04N 19/174*       (2014.01)
            (Continued)

(52) U.S. Cl.
    CPC ........... *H04N 19/70* (2014.11); *H04N 19/174* (2014.11); *H04N 19/184* (2014.11); *H04N 19/46* (2014.11)

(58) Field of Classification Search
    CPC .... H04N 19/70; H04N 19/174; H04N 19/184; H04N 19/46
    See application file for complete search history.

(56) References Cited

U.S. PATENT DOCUMENTS

2015/0271507 A1* 9/2015 Hendry .................. H04N 19/86
                                          375/240.25
2015/0350623 A1 12/2015 Zhang
(Continued)

FOREIGN PATENT DOCUMENTS

JP        6437096 B2    12/2018
WO    2019/038433      2/2019

OTHER PUBLICATIONS

International Search Report for PCT/EP2020/074619 mailed Nov. 30, 2020, 5 pages.
(Continued)

*Primary Examiner* — Patrick E Demosky
(74) *Attorney, Agent, or Firm* — Sage Patent Group

(57) ABSTRACT

A video decoding apparatus includes processing circuitry configured to perform operations comprising: receiving, from a video data stream, a sequence parameter set (SPS); parsing, from the SPS, an extra slice header bit map; mapping one or more bits in the extra slice header bit map to one or more flags that indicate presence or non-presence corresponding to a syntax element in a slice header; determining a number of extra slice header bits based on an amount of the one or more flags that indicate presence; and
(Continued)

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| [...] | |
| mapped_nut | u(5) |
| [...] | |
| vui_parameters_present_flag | u(1) |
| if( vui_parameters_present_flag ) | |
|    vui_parameters( ) | |
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

106~ parsing, from the video data stream, the syntax element in the slice header based on the determined number of extra slice header bits.

18 Claims, 11 Drawing Sheets

(51) Int. Cl.
H04N 19/184 (2014.01)
H04N 19/46 (2014.01)
H04N 19/70 (2014.01)

(56) References Cited

U.S. PATENT DOCUMENTS

2015/0358641 A1* 12/2015 Choi ................... H04N 19/105
375/240.13
2019/0199921 A1 6/2019 Oh et al.

OTHER PUBLICATIONS

Written Opinion of the ISA for PCT/EP2020/074619 mailed Nov. 30, 2020, 9 pages.
Hannuksela M M (Nokia), "AHG12/AHG17: Merging IRAP and non-IRAP VCL NAL units into the same coded picture", Joint Video Experts Team (JVET) of ITU-T SG 16 WP 3 and ISO/IEC JTC 1/SC 29/WG 11, Document JVET-N0047, 14$^{th}$ Meeting, Geneva, CH, Mar. 22, 2019, 8 pages.
Y-K Wang et al. (Huawei), "AHG12/AHG17: Allowing mixed IRAP and non-IRAP NAL unit types within a picture", Joint Video Experts Team (JVET) of ITU-SG 16 WP 3 and ISO/IEC JTC 1/SC 29/WG 11, Document JVET-N0108-v1, 14$^{th}$ Meeting, Geneva, CH, Mar. 12, 2019, 3 pages.
Skupin et al. (Fraunhofer), "AHG17/AHG12: NAL unit type mapping", Joint Video Experts Team (JVET) of ITU-T SG 16 WP 3 and ISO/IEC JTC 1/SC 29/WG 11, Document JVET-P0458, 16$^{th}$ Meeting, Geneva, CH, Sep. 25, 2019, 4 pages.
Suehring K et al: "AHG9: On extra picture header bits in VVC", 17. JVET Meeting; Jan. 7-17, 2020; Brussels; (The Joint Video Exploration Team of ISO/IEC JTC1 /SC29/WG11 and ITU-T SG.16 ), No. JVET-Q0400 ; m51995 Jan. 11, 2020, XP030223418, 4 pages.
Choi B et al (Samsung): "MV-HEVC/SHVC HLS: On interlayer prediction type", 5. JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ), No. JCT3V-E0114, Jul. 23, 2013, XP030244485, 4 pages.
Choi B et al: "Slice header clean-up", 12. JCT-VC Meeting; 103. MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-L0126, Jan. 8, 2013, XP030113614, 4 pages.

* cited by examiner high resolution tile low resolution

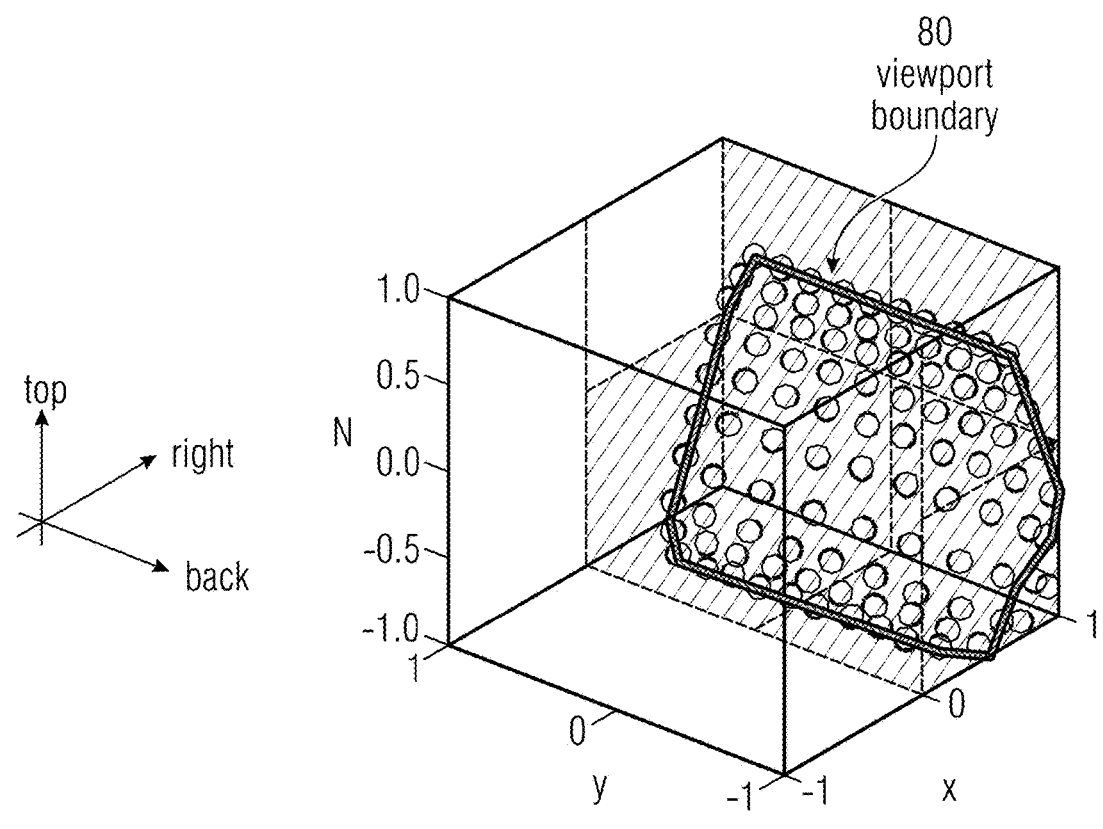
top
right
back
N
80
viewport
boundary
Fig. 3A
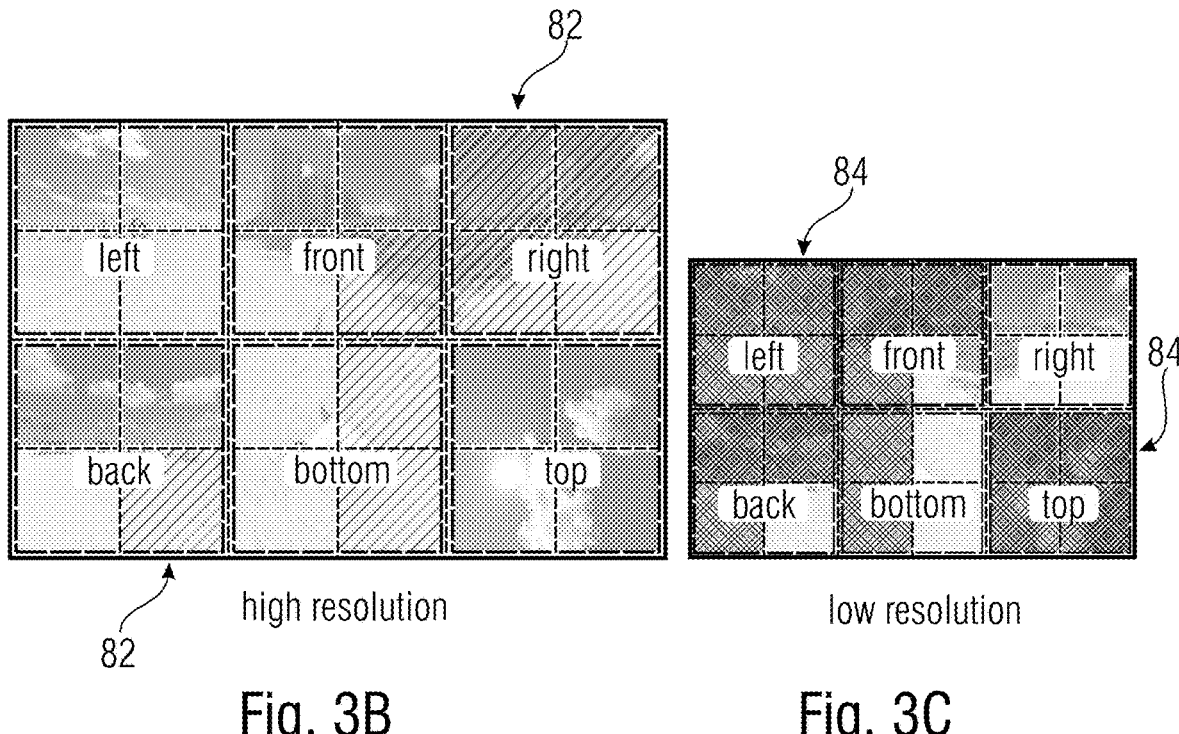
82
left    front    right
back    bottom    top
high resolution
82
Fig. 3B
84
left    front    right
back    bottom    top
84
low resolution
Fig. 3C high resolution tiles low resolution fallback packing

| nal_unit_header( ) { | Descriptor |
|---|---|
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

100

104

102

104

| nal_unit_type | name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RASL_NUT | Coded slice of a RASL picture slice_layer_rbsp( ) | VCL |
| 3 | RADL_NUT | Coded slice of a RADL picture slice_layer_rbsp( ) | VCL |
| 4..7 | RSV_VCL_4.. RSV_VCL_7 | Reserved non-IRAP VCL NAL unit types | VCL |
| 8 9 | IDR_W_RADL IDR_N_LP | Coded slice of an IDR picture slice_layer_rbsp( ) | VCL |
| 10 | CRA_NUT | Coded slice of a CRA picture silce_layer_rbsp( ) | VCL |
| 11 | GDR_NUT | Coded slice of a GDR picture slice_layer_rbsp( ) | VCL |
| 12 | MAP_NUT | Mappable VCL NAL unit type | VCL |
| 13 | RSV_IRAP_VCL13 | Reserved IRAP VCL NAL unit type | VCL |
| 14..15 | RSV_VCL14.. RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 | DPS_NUT | Decoding parameter set decoding_parameter_set_rbsp( ) | non-VCL |
| 25..27 | RSV_NVCL25.. RSV_NVCL27 | Reserved non-VCL NAL unit types | non-VCL |
| 28..31 | UNSPEC28.. UNSPEC31 | Unspecified non-VCL NAL unit types | non-VCL |

Fig. 9

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| [...] | |
| mapped_nut | u(5) |
| [...] | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| slice_segment_header( ) { | Descriptor |
|---|---|
|    first_slice_segment_in_pic_flag | u(1) |
|    if( nal_unit_type >= BLA_W_LP && <br>                     nal_unit_type <= RSV_IRAP_VCL23 ) | |
|       no_output_of_prior_pics_flag | u(1) |
|    slice_pic_parameter_set_id | ue(v) |
|    if( !first_slice_segment_in_pic_flag ) { | |
|       if( dependent_slice_segments_enabled_flag ) | |
|          dependent_slice_segment_flag | u(1) |
|       slice_segment_address | u(v) |
|    } | |
|    if( !dependent_slice_segment_flag ) { | |
|       i = 0 | |
|       if( num_extra_slice_header_bits > i ) { | |
|          i++ | |
|          discardable_flag | u(1) |
|       } | |
|       if( num_extra_slice_header_bits > i ) { | |
|          i++ | |
|          cross_layer_bla_flag | u(1) |
|       } | |
|       for( ; i < num_extra_slice_header_bits; i++ ) | |
|          slice_reserved_flag[ i ] | u(1) |
|    . . . | |
|    byte_alignment( ) | |
| } | |

Fig. 11

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| [...] | |
| extra_slice_header_bits_mapping_space_idc | u(5) |
| [...] | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| extra_slice_header_bits_mapping_space_idc | Flags |
|---|---|
| 0 | discardable_flag (1st and unique flag) |
| 1 | discardable_flag (1st flag) sub_layer_non_reference_flag (2nd flag) |
| 2 | gdr_refreshed_region_flag (1st and unique flag) |
| ... | ... |

| extra_slice_header_bits_struct ( ) { | Descriptor |
|---|---|
| discardable_flag_present_flag | u(1) |
| sub_layer_non_reference_flag_present_flag | u(1) |
| gdr_refreshed_region_flag_present_flag | u(1) |
| [...]//further flags | |
| } | |

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| [...] | |
| for( i = 0; i < num_extra_slice_header_bits; i++ ) | |
| extra_slice_header_bit_mapping_idc[ i ] | u(3) |
| [...] | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| extra_slice_header_bit_mapping_idc | Flags |
|---|---|
| 0 | discardable_flag |
| 1 | sub_layer_non_reference_flag |
| 2 | gdr_refreshed_region_flag |
| ... | ... |

| slice_segment_header( ) { | Descriptor |
|---|---|
| first_slice_segment_in_pic_flag | u(1) |
| if( nal_unit_type >= BLA_W_LP && <br>            nal_unit_type <= RSV_IRAP_VCL23 ) | |
| no_output_of_prior_pics_flag | u(1) |
| slice_pic_parameter_set_id | ue(v) |
| if( !first_slice_segment_in_pic_flag ) { | |
| if( dependent_slice_segments_enabled_flag ) | |
| dependent_slice_segment_flag | u(1) |
| slice_segment_address | u(v) |
| } | |
| if( !dependent_slice_segment_flag ) { | |
| extra_slice_header_bit_idc | u(2) |
| [...] | |
| byte_alignment( ) | |
| } | |

Fig. 17

| extra_slice_header_bit_idc | Flags |
|---|---|
| 0 | discardable_flag == 1 <br> sub_layer_non_reference_flag == 0 <br> gdr_refreshed_region_flag == 1 |
| 1 | discardable_flag == 0 <br> sub_layer_non_reference_flag == 1 <br> gdr_refreshed_region_flag == 1 |
| 2 | discardable_flag == 1 <br> sub_layer_non_reference_flag == 1 <br> gdr_refreshed_region_flag == 0 |
| ... | ... |

Fig. 18

CONFIGURABLE NAL AND SLICE CODE POINT MECHANISM FOR STREAM MERGING

This application is a continuation of U.S. application Ser. No. 17/639,761 filed Mar. 2, 2022, which is the U.S. national phase of International Application No. PCT/EP2020/074619 filed Sep. 3, 2020 which designated the U.S. and claims priority to EP 19195198.7 filed Sep. 3, 2019, the entire contents of each of which are hereby incorporated by reference.

The present application relates to a data structure for indicating a coding unit type and characteristics of a video coding unit of a video data stream.

It is known that the picture types are indicated in the NAL unit headers of the NAL units carrying the slices of the pictures. Thereby, essential properties of the NAL unit payload is available at a very high level for use by applications.

The picture types include the following:

Random access point (RAP) pictures, where a decoder may start decoding a coded video sequence. These are referred to as Intra Random Access Pictures (IRAP). Three IRAP picture types exist: Instantaneous Decoder Refresh (IDR), Clean Random Access (CRA), and Broken Link Access (BLA). The decoding process for a coded video sequence always starts at an IRAP.

Leading pictures, which precede a random access point picture in output order but are coded after it in the coded video sequence. Leading pictures which are independent of pictures preceding the random access point in coding order are called Random Access Decodable Leading pictures (RADL). Leading pictures which use pictures preceding the random access point in coding order for prediction might be corrupted if decoding starts at the corresponding IRAP. These are called Random Access Skipped Leading pictures (RASL).

Trailing (TRAIL) pictures, which follow the IRAP and the leading pictures in both, output and display order.

Pictures at which the temporal resolution of the coded video sequence may be switched by the decoder: Temporal Sublayer Access (TSA) and Stepwise Temporal Sublayer Access (STSA).

Hence, the data structure of nal unit is an important factor for stream merging.

The object of the subject-matter of the present application is to provide a decoder which derives necessary information of a video coding unit of a video data stream by reading an identifier indicative of a substitute coding unit type and a decoder which derives characteristics of a video data stream.

Further object of the subject-matter of the present application is to provide an encoder which indicates a substitute coding unit type for a video coding unit by using identifier and an encoder which indicates characteristics of a video data stream.

This object is achieved by the subject-matter of the claims of the present application.

In accordance with embodiments of the present application, a video decoder configured to decode a video comprising a plurality of pictures from a video data stream by decoding each picture from one or more video coding units within an access unit of the video data stream which is associated with the respective picture; read a substitute coding unit type from a parameter set unit of the video data stream; for each predetermined video coding unit, read a coding unit type identifier (100), e.g., a syntax element included in a nal unit header, from the respective video coding unit; check whether the coding unit identifier identifies a coding unit type out of a first subset of one or more coding unit types (102), e.g., indicating whether the nal unit is mappable VCL (video coding layer) unit type or not, or out of a second subset of coding unit types (104), e.g., indicating the nal unit type, if the coding unit identifier identifies a coding unit type out of the first subset of one or more coding unit types, attribute the respective predetermined video coding unit to the substitute coding unit type; if the coding unit identifier identifies a coding unit type out of the second subset of coding unit types, attribute the respective predetermined video coding unit to the coding unit type out of the second subset of coding unit types identified by the coding unit identifier. That is, the respective nal unit type is indicated by the identifier, the first subset of coding unit type and the second subset of coding unit type, i.e., the nal unit type is rewritten following the indication of the first and second subset of coding unit type. Hence, it is possible to improve merging efficiency.

In accordance with the embodiments of the present application the video decoder configured to decode, from each video coding unit, the region associated with the respective video coding unit in a manner depending on the coding unit type attributed to the respective video coding unit. The video decoder may be configured so that the substitute coding unit type is out of the second subset of video coding types. The video decoder may be configured so that the substitute coding unit type is out of a third subset of video coding types, e.g., non-VCL unit type, which comprises at least one video coding type not included by the second subset of video coding types. According to the present application, it is possible to improve coding efficiency.

In accordance with the embodiments of the present application, the predetermined video coding units carry picture block partitioning data, block-related prediction parameters and prediction residual data. When a picture contains both one or more video coding units, e.g., slices, with a coding unit type of the first subset and one or more video coding units, e.g., slices, with a coding unit type of the second subset, the latter video coding units are of a coding unit type equal to the substitute coding unit type. The substitute coding unit type is a random access point, RAP, coding type. The substitute coding unit type is a coding type other than a random access point, RAP, coding type. That is, the substitute coding unit type is identified and the video coding units having the same substitute coding unit type is merged, and, hence, the merging efficiency is appropriately improved.

In accordance with the embodiments of the present application, each of the predetermined video coding units is associated with a different region of the picture with which the access unit is associated within which the respective predetermined video coding unit is. The parameter set unit of the video data stream has a scope covering a sequence of pictures, one picture or a set of slices out of one picture. The parameter set unit is indicative of the substitute coding unit type in a video data stream profile specific manner. That is, it is possible to efficiently merge the slices, and, hence, to improve coding efficiency.

In accordance with the embodiments of the present application, the parameter set unit of the video data stream is either; the parameter set unit having a scope covering a sequence of pictures, or an access unit delimiter having a scope covering one or more of pictures associated to the access unit. That is, the sequence of the pictures is appropriately indicated and, hence, it is possible to efficiently decode the pictures which are required to be rendered.

In accordance with the embodiments of the present application, the parameter set unit is indicative of the substitute coding unit type in a video data stream, whether the predetermined video coding unit is used as the refreshed starting point of the video sequence for decoding a video, e.g., RAP type, i.e. include an instantaneous decoding refresh, IDR, or the continuous starting point of the video sequence for decoding a video, e.g., non-RAP type, i.e. does not include IDR. That is, it is possible to indicate the coding unit is the first picture of the video sequence or not by using the parameter set unit.

In accordance with embodiments of the present application, a video decoder configured to decode a video comprising a plurality of pictures from a video data stream by decoding each picture from one or more video coding units within an access unit of the video data stream which is associated with the respective picture, wherein each video coding unit carries picture block partitioning data, block-related prediction parameters and prediction residual data and is associated with a different region of the picture with which the access unit is associated within which the respective predetermined video coding unit is; read, from each of predetermined video coding unit, an n-ary set of one more syntax elements, e.g. two flags, each being 2-ary so that the pair is 4-ary, map (200), e.g., the mapping may be fixed by default; alternatively, it is signaled in the data stream, or both by splitting the value range, the n-ary set of one more syntax elements onto a m-ary set of one or more characteristics (202), e.g. three binary characteristics, each being, thus, 2-ary so that the triplet is 8-ary, each characteristic describing in a manner redundant with corresponding data in the predetermined video coding unit, i.e. the characteristics may be deduced from an inspection of deeper coding data, as to how the video is coded into the video data stream with respect to the picture with which the access unit is associated within which the predetermined video coding unit is, wherein m>n, or read, from each of predetermined video coding unit, N syntax elements (210), e.g. N=2 flags, each being 2-ary, with N>0, read an association information from the video data stream, associate, i.e. treat them as a variable of the associated characteristic, depending on the association information, each of the N syntax elements with an information on one of M characteristics, e.g. M=3 binary characteristics, each being, thus, 2-ary→the association information would have 3 possibilities to associate the two flags with 2 out of 3, i.e.

$$\binom{M}{N},$$

characteristics, each characteristic describing in a manner redundant with corresponding data in the predetermined video coding unit as to how the video is coded into the video data stream with respect to the picture with which the access unit is associated within which the predetermined video coding unit is, wherein M>N. That is, for example, the video data stream condition, i.e., how the video is coded into the video data stream with respect to the picture in the access unit, is indicated by the map and flags, it is possible to efficiently provide extra information.

In accordance with the embodiments of the present application, the map is included in the parameter set unit and indicative of the location of the mapped characteristics. The map is signaled in the data stream and indicative of the location of the mapped characteristics. The N syntax elements are indicative of presence of the characteristics. That is, combining the flag and mapping, there is a flexibility of indicating the flags at the parameter set.

In accordance with embodiment of the present application, a video encoder configured to encode a video comprising a plurality of pictures into a video data stream by encoding each picture into one or more video coding units within an access unit of the video data stream which is associated with the respective picture; indicate a substitute coding unit type in a parameter set unit of the video data stream; for each predetermined video coding unit, encode into the video data stream a coding unit type identifier (100) for the respective video coding unit, wherein the coding unit identifier identifies a coding unit type out of a first subset of one or more coding unit types (102) or out of a second subset of coding unit types (104), wherein if the coding unit identifier identifies a coding unit type out of the first subset of one or more coding unit types, the respective predetermined video coding unit is to be attributed to the substitute coding unit type; if the coding unit identifier identifies a coding unit type out of the second subset of coding unit types, the respective predetermined video coding unit is to be attributed to the coding unit type out of the second subset of coding unit types identified by the coding unit identifier, wherein the substitute coding unit type is a RAP type and the video encoder is configured to identify video coding units of RAP pictures as the predetermined video coding units, and e.g. directly encode coding unit type identifier for purely intra-coded video coding units of non-RAP pictures which identifies a RAP type. That is, the coding unit type is indicated in the parameter set unit of the video data stream, and, therefore, it is possible to improve encoding efficiency, i.e., it is not necessary to encode each segment with IDR picture.

In accordance with embodiments of the present application, a video composer configured to compose a video data stream having a video comprising a plurality of pictures encoded thereinto, each picture being into one or more video coding units within an access unit of the video data stream which one or more video coding units are associated with the respective picture for each of tiles into which the pictures are subdivided; change a substitute coding unit type in a parameter set unit of the video data stream from indicting RAP type so as to indicate a non-RAP type; identify in the v d s pictures exclusively coded video coding units whose identifier (100) encoded into the video data stream a coding unit type identifies a RAP pictures; wherein for each of predetermined video coding units of the video data stream, an identifier (100) for the respective p video coding unit encoded into the video data stream a coding unit type identifies a coding unit type out of a first subset of one or more coding unit types (102) or out of a second subset of coding unit types (104), wherein if the coding unit identifier identifies a coding unit type out of the first subset of one or more coding unit types, the respective predetermined video coding unit is to be attributed to the substitute coding unit type; if the coding unit identifier identifies a coding unit type out of the second subset of coding unit types, the respective predetermined video coding unit is to be attributed to the coding unit type out of the second subset of coding unit types identified by the coding unit identifier. The type of the video coding unit is identified by using the identifier, a first and a second subset of coding unit type, and, hence, the picture of the video, e.g., constructed by a plurality of tiles, is efficiently composed.

In accordance with embodiments of the present application, a video encoder configured to encode a video comprising a plurality of pictures into a video data stream by encoding each picture into one or more video coding units within an access unit of the video data stream which is associated with the respective picture, wherein each video coding unit carries picture block partitioning data, block-related prediction parameters and prediction residual data and is associated with a different region of the picture with which the access unit is associated within which the respective predetermined video coding unit is; indicate, into each of predetermined video coding unit, an n-ary set of one more syntax elements, e.g. two flags, each being 2-ary so that the pair is 4-ary, map (200), the mapping may be fixed by default; alternatively, it is signaled in the data stream, or both by splitting the value range, the n-ary set of one more syntax elements onto a m-ary set of one or more characteristics (202), e.g. three binary characteristics, each being, thus, 2-ary so that the triplet is 8-ary, each characteristic describing in a manner redundant with corresponding data in the predetermined video coding unit, i.e. the characteristics may be deduced from an inspection of deeper coding data, as to how the video is coded into the video data stream with respect to the picture with which the access unit is associated within which the predetermined video coding unit is, wherein m>n, or indicate, into each of predetermined video coding unit, N syntax elements (210), e.g. N=2 flags, each being 2-ary, with N>0, indicate an association information into the video data stream, associate, i.e. treat them as a variable of the associated characteristic, depending on the association information, each of the N syntax elements with an information on one of M characteristics, e.g. M=3 binary characteristics, each being, thus, 2-ary→the association information would have 3 possibilities to associate the two flags with 2 out of 3, i.e.

$$\binom{M}{N},$$

characteristics, each characteristic describing in a manner redundant with corresponding data in the predetermined video coding unit as to how the video is coded into the video data stream with respect to the picture with which the access unit is associated within which the predetermined video coding unit is, wherein M>N. That is, for example, characteristics of each video coding unit of a coded video sequence is indicated by using flag, and, therefore, it is possible to efficiently provide extra information.

In accordance with embodiments of the present application, a method comprising decoding a video comprising a plurality of pictures from a video data stream by decoding each picture from one or more video coding units within an access unit of the video data stream which is associated with the respective picture; reading a substitute coding unit type from a parameter set unit of the video data stream; for each predetermined video coding unit, reading a coding unit type identifier from the respective video coding unit; checking whether the coding unit identifier identifies a coding unit type out of a first subset of one or more coding unit types or out of a second subset of coding unit types, if the coding unit identifier identifies a coding unit type out of the first subset of one or more coding unit types, attribute the respective video coding unit to the substitute coding unit type; if the coding unit identifier identifies a coding unit type out of the second subset of coding unit types, attribute the respective video coding unit to the coding unit type out of the second subset of coding unit types identified by the coding unit identifier.

In accordance with embodiments of the present application, a method comprising decoding a video comprising a plurality of pictures from a video data stream by decoding each picture from one or more video coding units within an access unit of the video data stream which is associated with the respective picture, wherein each video coding unit carries picture block partitioning data, block-related prediction parameters and prediction residual data and is associated with a different region of the picture with which the access unit is associated within which the respective predetermined video coding unit is; reading, from each of predetermined video coding unit, an n-ary set of one more syntax elements, e.g. two flags, each being 2-ary so that the pair is 4-ary, map, the mapping may be fixed by default; alternatively, it is signaled in the data stream, or both by splitting the value range, the n-ary set of one more syntax elements onto a m-ary set of one or more characteristics, e.g. three binary characteristics, each being, thus, 2-ary so that the triplet is 8-ary, each characteristic describing in a manner redundant with corresponding data in the predetermined video coding unit [i.e. the characteristics may be deduced from an inspection of deeper coding data] as to how the video is coded into the video data stream with respect to the picture with which the access unit is associated within which the predetermined video coding unit is, wherein m>n, or reading, from each of predetermined video coding unit, N syntax elements, e.g. N=2 flags, each being 2-ary, with N>0, read an association information from the video data stream, associate, i.e. treat them as a variable of the associated characteristic, depending on the association information, each of the N syntax elements with an information on one of M characteristics, e.g. M=3 binary characteristics, each being, thus, 2-ary→the association information would have 3 possibilities to associate the two flags with 2 out of 3, i.e.

$$\binom{M}{N},$$

characteristics, each characteristic describing in a manner redundant with corresponding data in the predetermined video coding unit as to how the video is coded into the video data stream with respect to the picture with which the access unit is associated within which the predetermined video coding unit is, wherein M>N.

In accordance with embodiments of the present application, a method comprising encoding a video comprising a plurality of pictures into a video data stream by encoding each picture into one or more video coding units within an access unit of the video data stream which is associated with the respective picture; indicating a substitute coding unit type in a parameter set unit of the video data stream; for each predetermined video coding unit, defining a coding unit type identifier (100) for the respective video coding unit, wherein the coding unit identifier identifies a coding unit type out of a first subset of one or more coding unit types (102) or out of a second subset of coding unit types (104), if the coding unit identifier identifies a coding unit type out of the first subset of one or more coding unit types, attribute the respective video coding unit to the substitute coding unit type; if the coding unit identifier identifies a coding unit type out of the second subset of coding unit types, attribute the respective video coding unit to the coding unit type out of the second subset of coding unit types identified by the coding unit identifier.

In accordance with embodiments of the present application, a method comprising composing a video data stream having a video comprising a plurality of pictures encoded thereinto, each picture being into one or more video coding units within an access unit of the video data stream which one or more video coding units are associated with the respective picture for each of tiles into which the pictures are subdivided; changing a substitute coding unit type in a parameter set unit of the video data stream from indicting RAP type so as to indicate a non-RAP type; identifying in the v d s pictures exclusively coded video coding units whose identifier (100) encoded into the video data stream a coding unit type identifies a RAP pictures; wherein for each of predetermined video coding units of the video data stream, an identifier (100) for the respective p video coding unit encoded into the video data stream a coding unit type identifies a coding unit type out of a first subset of one or more coding unit types (102) or out of a second subset of coding unit types (104), wherein if the coding unit identifier identifies a coding unit type out of the first subset of one or more coding unit types, the respective predetermined video coding unit is to be attributed to the substitute coding unit type; if the coding unit identifier identifies a coding unit type out of the second subset of coding unit types, the respective predetermined video coding unit is to be attributed to the coding unit type out of the second subset of coding unit types identified by the coding unit identifier.

In accordance with embodiments of the present application, a method comprising encoding, a video comprising a plurality of pictures into a video data stream by encoding each picture into one or more video coding units within an access unit of the video data stream which is associated with the respective picture, wherein each video coding unit carries picture block partitioning data, block-related prediction parameters and prediction residual data and is associated with a different region of the picture with which the access unit is associated within which the respective predetermined video coding unit is; indicating, into each of predetermined video coding unit, an n-ary set of one more syntax elements, e.g. two flags, each being 2-ary so that the pair is 4-ary, map (200), the mapping may be fixed by default; alternatively, it is signaled in the data stream, or both by splitting the value range, the n-ary set of one more syntax elements onto a m-ary set of one or more characteristics (202), e.g. three binary characteristics, each being, thus, 2-ary so that the triplet is 8-ary, each characteristic describing in a manner redundant with corresponding data in the predetermined video coding unit, i.e. the characteristics may be deduced from an inspection of deeper coding data, as to how the video is coded into the video data stream with respect to the picture with which the access unit is associated within which the predetermined video coding unit is, wherein m>n, or indicating, into each of predetermined video coding unit, N syntax elements (210), e.g. N=2 flags, each being 2-ary, with N>0, indicating an association information into the video data stream, associate, i.e. treat them as a variable of the associated characteristic, depending on the association information, each of the N syntax elements with an information on one of M characteristics, e.g. M=3 binary characteristics, each being, thus, 2-ary→the association information would have 3 possibilities to associate the two flags with 2 out of 3, i.e.

8

$$\binom{M}{N},$$

characteristics, each characteristic describing in a manner redundant with corresponding data in the predetermined video coding unit as to how the video is coded into the video data stream with respect to the picture with which the access unit is associated within which the predetermined video coding unit is, wherein M>N.

Preferred embodiments of the present application are described below with respect to the figures, among which:

FIGS. 3A to 3C show a schematic illustration indicating an example of user viewpoint and tile selections for the 360-degree video streaming as indicated in FIGS. 2A and 2B;

FIG. 9 shows an example of a table indicating the type of RBSP (Row Byte Sequence Payloads) data structure contained in the NAL unit according to embodiments of the present application;

FIG. 10 shows a schematic diagram indicating an example of sequence parameter set indicating that the NAL unit type is mapped according to embodiments of the present application;

FIG. 11 shows a schematic diagram indicating an example of characteristics of a slice indicated in a slice header;

FIG. 12 shows a schematic diagram indicating an example of a map indicating characteristics of a slice in the sequence parameter set according to embodiments of the present application;

FIG. 13 shows a schematic diagram indicating an example of characteristics indicated by the map in the sequence parameter set of FIG. 12 according to embodiments of the present application;

FIG. 14 shows a schematic diagram indicating an example of association information indicated by using the syntax structure according to embodiments of the present application;

FIG. 15 shows a schematic diagram indicating another example of the map indicating characteristics of a slice in the sequence parameter set according to embodiments of the present application;

FIG. 16 shows a schematic diagram indicating another example of characteristics indicated by the map in the parameter set of FIG. 15 according to embodiments of the present application;

FIG. 17 shows a schematic diagram indicating further example of the map indicating characteristics of a slice in a slice segment header according to embodiments of the present application; and FIG. 18 shows a schematic diagram indicating further example of characteristics indicated by the map in the slice segment header of FIG. 17 according to embodiments of the present application.

Figure 1:
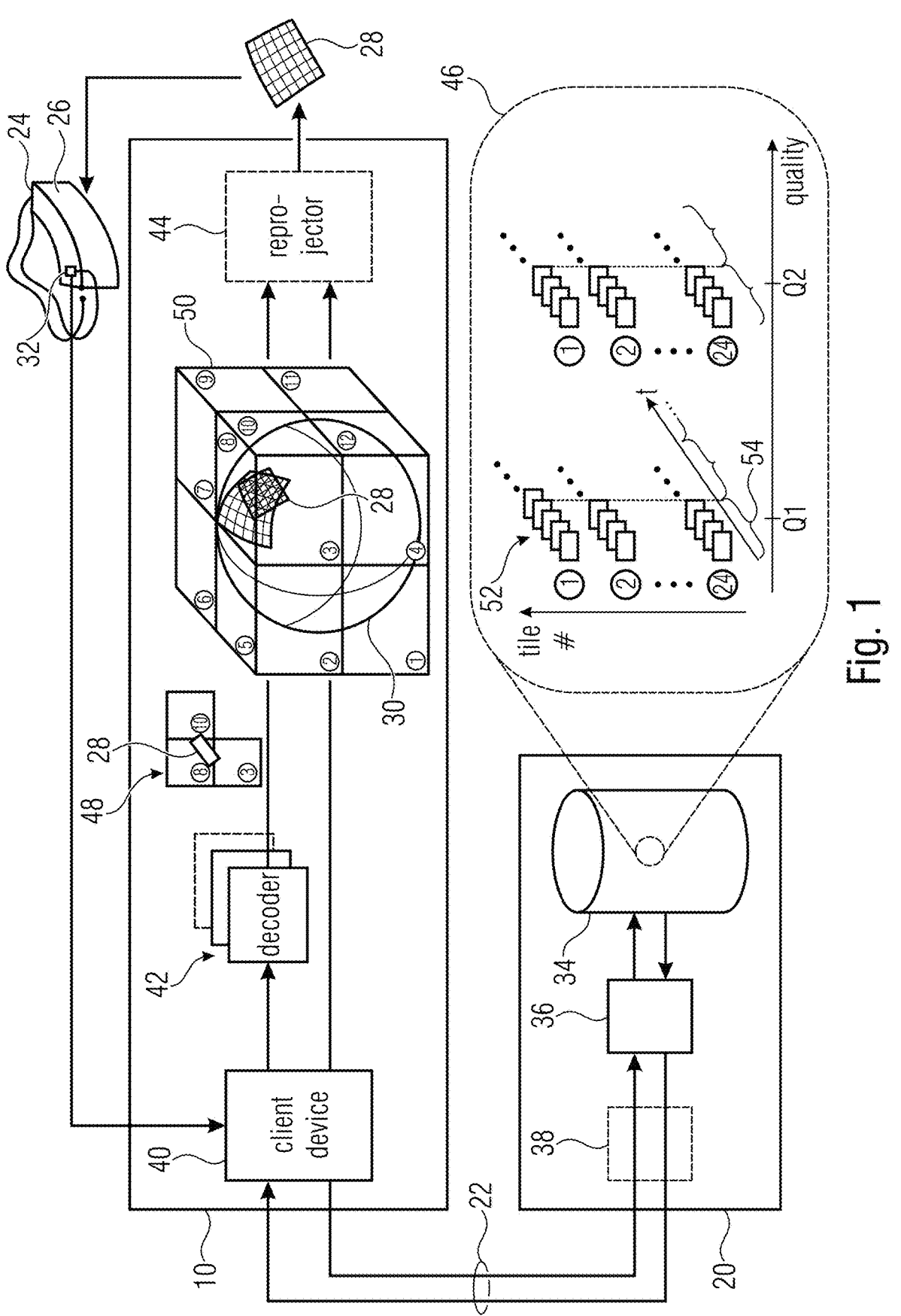
FIG. 1 shows a schematic diagram illustrating a system of client and server for virtual reality applications as an example as to where the embodiments set forth in the following figures may be advantageously used.

Equal or equivalent elements or elements with equal or equivalent functionality are denoted in the following description by equal or equivalent reference numerals.

In the following description, a plurality of details is set forth to provide a more thorough explanation of embodiments of the present application. However, it will be apparent to one skilled in the art that embodiments of the present application may be practiced without these specific details. In other instances, well-known structures and devices are shown in block diagram form rather than in detail in order to avoid obscuring embodiments of the present application. In addition, features of the different embodiments described hereinafter may be combined with each other, unless specifically noted otherwise.

INTRODUCTORY REMARKS

In the following, it should be noted that individual aspects described herein can be used individually or in combination. Thus, details can be added to each of said individual aspects without adding details to another one of said aspects.

It should also be noted that the present disclosure describes, explicitly or implicitly, features usable in a video decoder (apparatus for providing a decoded representation of a video signal on the basis of an encoded representation). Thus, any of the features described herein can be used in the context of a video decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

In order to ease the understanding of the description of embodiments of the present application with respect to the various aspects of the present application, FIG. 1 shows an example for an environment where the subsequently described embodiments of the present application may be applied and advantageously used. In particular, FIG. 1 shows a system composed of client 10 and server 20 interacting via adaptive streaming. For instance, dynamic adaptive streaming over HTTP (DASH) may be used for the communication 22 between client 10 and server 20. However, the subsequently outlined embodiments should not be interpreted as being restricted to the usage of DASH and likewise, terms such as media presentation description (MPD) should be understand as being broad so as to also cover manifest files defined differently than in DASH.

FIG. 1 illustrates a system configured to implement a virtual reality application. That is, the system is configured to present to a user wearing a head up display 24, namely via an internal display 26 of head up display 24, a view section 28 out of a temporally-varying spatial scene 30 which section 28 corresponds to an orientation of the head up display 24 exemplarily measured by an internal orientation sensor 32 such as an inertial sensor of head up display 24. That is, the section 28 presented to the user forms a section of the spatial scene 30 the spatial position of which corresponds to the orientation of head up display 24. In case of FIG. 1, the temporally-varying spatial scene 30 is depicted as an omni-directional video or spherical video, but the description of FIG. 1 and the subsequently explained embodiments are readily transferrable to other examples as well, such as presenting a section out of a video with a spatial position of section 28 being determined by an intersection of a facial access or eye access with a virtual or real projector wall or the like. Further, sensor 32 and display 26 may, for instance, be comprised by different devices such as remote control and corresponding television, respectively, or they may be part of a hand-held device such as a mobile device such as a tablet or a mobile phone. Finally, it should be noted that some of the embodiments described later on, may also be applied to scenarios where the area 28 presented to the user constantly covers the whole temporally-varying spatial scene 30 with the unevenness in presenting the temporally-varying spatial scene relating, for instance, to an unequal distribution of quality over the spatial scene.

Further details with respect to server 20, client 10 and the way the spatial content 30 is offered at server 20 is illustrated in FIG. 1 and described in the following. These details should, however, also not be treated as limiting the subsequently explained embodiments, but should rather serve as an example of how to implement any of the subsequently explained embodiments.

In particular, as shown in FIG. 1, server 20 may comprise a storage 34 and a controller 36 such as an appropriately programmed computer, an application-specific integrated circuit or the like. The storage 34 has media segments stored thereon which represent the temporally-varying spatial scene 30. A specific example will be outlined in more detail below with respect to the illustration of FIG. 1. Controller 36 answers requests sent by client 10 by re-sending to client 10 requested media segments, a media presentation description and may send to client 10 further information on its own. Details in this regard are also set out below. Controller 36 may fetch requested media segments from storage 34. Within this storage, also other information may be stored such as the media presentation description or parts thereof, in the other signals sent from server 20 to client 10.

As shown in FIG. 1, server 20 may optionally in addition comprise a stream modifier 38 modifying the media segments sent from server 20 to client 10 responsive to the requests from the latter, so as to result at client 10 in a media data stream forming one single media stream decodable by one associated decoder although, for instance, the media segments retrieved by client 10 in this manner are actually aggregated from several media streams. However, the existence of such a stream modifier 38 is optional.

Client 10 of FIG. 1 is exemplarily depicted as comprising a client device or controller 40 or more decoders 42 and a reprojector 44. Client device 40 may be an appropriately programmed computer, a microprocessor, a programmed hardware device such as an FPGA or an application specific integrated circuit or the like. Client device 40 assumes responsibility for selecting segments to be retrieved from server 20 out of the plurality 46 of media segments offered at server 20. To this end, client device 40 retrieves a manifest or media presentation description from server 20 first. From the same, client device 40 obtains a computational rule for computing addresses of media segments out of plurality 46 which correspond to certain, needed spatial portions of the spatial scene 30. The media segments thus selected are retrieved by client device 40 from server 20 by sending respective requests to server 20. These requests contain computed addresses.

The media segments thus retrieved by client device 40 are forwarded by the latter to the one or more decoders 42 for decoding. In the example of FIG. 1, the media segments thus retrieved and decoded represent, for each temporal time unit, merely a spatial section 48 out of the temporally-varying spatial scene 30, but as already indicated above, this may be different in accordance with other aspects, where, for instance, the view section 28 to be presented constantly covers the whole scene. Reprojector 44 may optionally re-project and cut-out the view section 28 to be displayed to the user out of the retrieved and decoded scene content of the selected, retrieved and decoded media segments. To this end, as shown in FIG. 1, client device 40 may, for instance, continuously track and update a spatial position of view section 28 responsive to the user orientation data from sensor 32 and inform reprojector 44, for instance, on this current spatial position of scene section 28 as well as the reprojection mapping to be applied onto the retrieved and decoded media content so as to be mapped onto the area forming view section 28. Reprojector 44 may, accordingly, apply a mapping and an interpolation onto a regular grid of pixels, for instance, to be displayed on display 26.

FIG. 1 illustrates the case where a cubic mapping has been used to map the spatial scene 30 onto tiles 50. The tiles are, thus, depicted as rectangular sub-regions of a cube onto which scene 30 having the form of a sphere has been projected. Reprojector 44 reverses this projection. However, other examples may be applied as well. For instance, instead of a cubic projection, a projection onto a truncated pyramid or a pyramid without truncation may be used. Further, although the tiles of FIG. 1 are depicted as being non-overlapping in terms of coverage of the spatial scene 30, the subdivision into tiles may involve a mutual tile-overlapping. And as will be outlined in more detail below, the subdivision of scene 30 into tiles 50 spatially with each tile forming one representation as explained further below, is also not mandatory.

Thus, as depicted in FIG. 1, the whole spatial scene 30 is spatially subdivided into tiles 50. In the example of FIG. 1, each of the six faces of the cube is subdivided into 4 tiles. For illustration purposes, the tiles are enumerated. For each tile 50, server 20 offers a video 52 as depicted in FIG. 1. To be more precise, server 20 even offers more than one video 52 per tile 50, these videos differing in quality Q #. Even further, the videos 52 are temporally subdivided into temporal segments 54. The temporal segments 54 of all videos 52 of all tiles T #form, or are encoded into, respectively, one of the media segments of the plurality 46 of media segments stored in storage 34 of server 20.

It is again emphasized that even the example of a tile-based streaming illustrated in FIG. 1 merely forms an example from which many deviations are possible. For instance, although FIG. 1 seems to suggest that the media segments pertaining to a representation of the scene 30 at a higher quality relate to tiles coinciding to tiles to which media segments belong which have the scene 30 encoded thereinto at quality Q1 this coincidence is not necessary and the tiles of different qualities may even correspond to tiles of a different projection of scene 30. Moreover, although not discussed so far, it may be that the media segments corresponding to different quality levels depicted in FIG. 1 differ in spatial resolution and/or signal to noise ratio and/or temporal resolution or the like.

Finally, differing from a tile-based streaming concept, according to which the media segments which may be individually retrieved by device 40 from server 20, relate to tiles 50 into which scene 30 is spatially subdivided, the media segments offered at server 20 may alternatively, for instance, each having the scene 30 encoded thereinto in a spatially complete manner with a spatially varying sampling resolution, however, having sampling resolution maximum at different spatial positions in scene 30. For instance, that could be achieved by offering at the server 20 sequences of segments 54 relating to a projecting of the scene 30 onto truncated pyramids the truncated tip of which would be oriented into mutually different directions, thereby leading to differently oriented resolution peaks.

Further, as to optionally present stream modifier 38, it is noted that same may alternatively be part of the client 10, or same may even be positioned inbetween, within a network device via which client 10 and server 20 exchange the signals described herein.

Figure 2A:
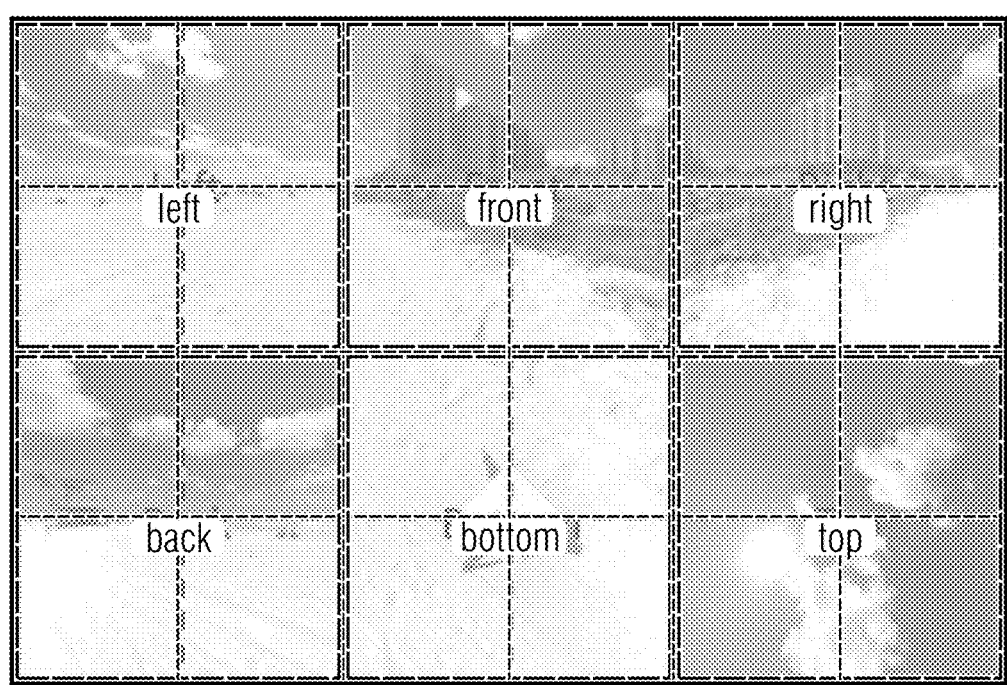
FIGS. 2A and 2B show a schematic illustration indicating an example of a 360-degree video in a cube map projection at two resolutions and tiled into 6×4 tiles, which may fit to the system of FIG. 1.
Figure 2B:
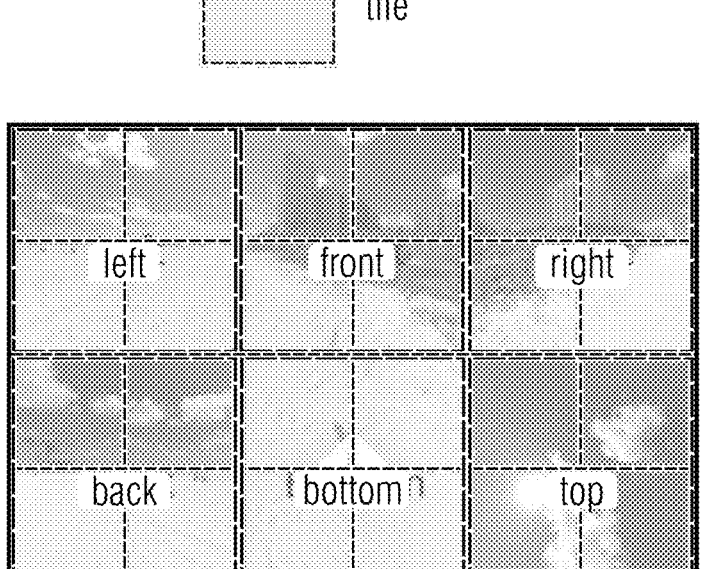

There exists certain video based application in which multiple coded video bitstreams are to be jointly decoded, i.e. merged into a joint bitstream and fed into a single decoder, such as:

multi-party conferencing: in which coded video streams from multiple participants are processed on a single end point or tile-based streaming: e.g. for 360-degree tiled video playback in VR applications In the latter, a 360-degree video is spatially segmented and each spatial segment is offered to streaming clients in multiple representations of varying spatial resolutions as illustrated in FIGS. 2A to 2B. FIG. 2A shows high resolution tiles and FIG. 2B shows low resolution tiles. FIGS. 2A and 2B, show a cube map projected 360-degree video divided into 6×4 spatial segments at two resolutions. For simplicity, these independent decodable spatial segments are referred to as tiles in this description.

A user typically watches only a subset of the tiles constituting the entire 360-degree video, when using state-of-the-art head-mounted-displays, as illustrated in FIG. 3A through a solid viewport boundary 80 representing a Field of View of 90×90 degrees. The corresponding tiles are indicated by a reference numeral 82 in FIG. 3B, are downloaded at highest resolution.

Figure 4:
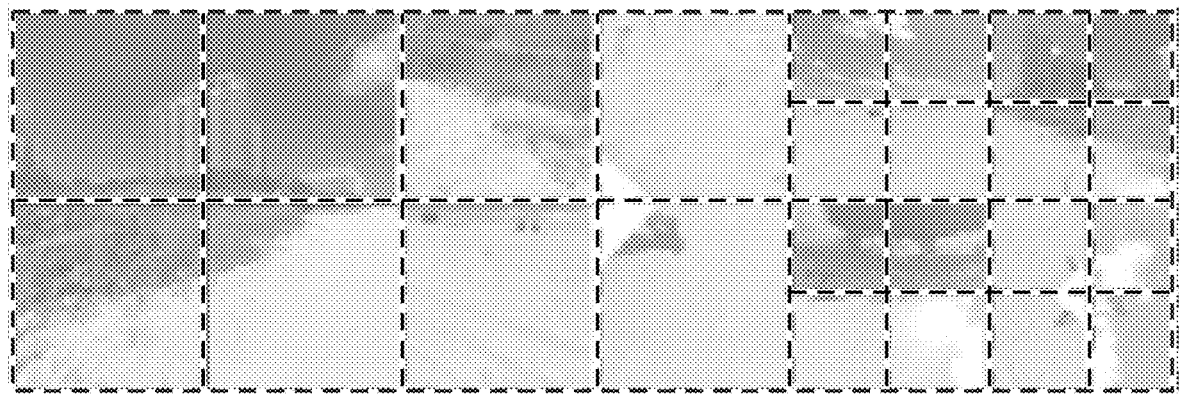
FIG. 4 shows a schematic illustration indicating an example of a resulting tile arrangement (packing) of tiles indicated in FIGS. 3A to 3C in a joint bitstream after merging operation.

However, the client application will also have to download and decode a representation of the other tiles outside the current viewport, indicated by a reference numeral 84 in FIG. 3C, in order to handle sudden orientation changes of the user. A client in such an application would thus download tiles that cover its current viewport in the highest resolution and tiles outside its current viewport in comparatively lower resolution as indicated in FIG. 3C while the selection of tile resolutions is constantly adapted to the orientation of the user. After download on client side, merging the downloaded tiles into a single bitstream to be processed with a single decoder is a means to address the constraints of typical mobile devices with limited computational and power resources. FIG. 4 illustrates a possible tile arrangement in a joint bitstream for the above examples. The merging operations to generate a joint bitstream has to be carried out through compressed-domain processing, i.e. avoiding processing on pixel-domain through transcoding.

Figure 5A:
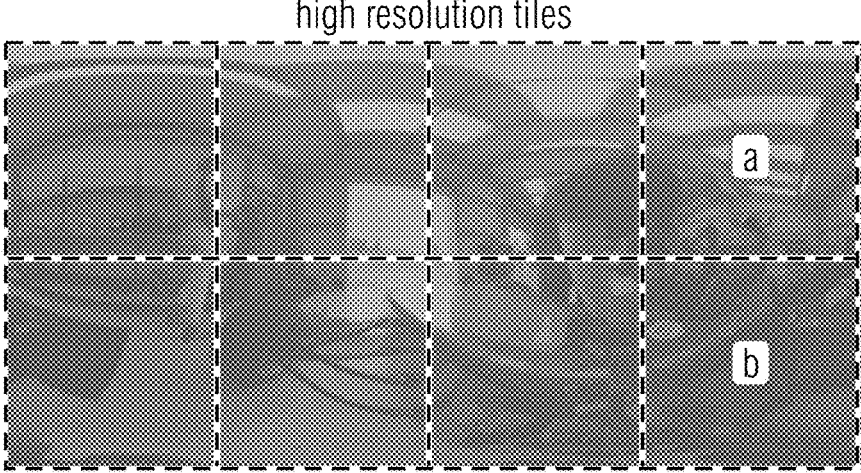
FIGS. 5A to 5C show a schematic illustration indicating an example of a tiling with a low resolution fall-back as a single tile for the for 360-degree video streaming.
Figure 5B:
Figure 5C:
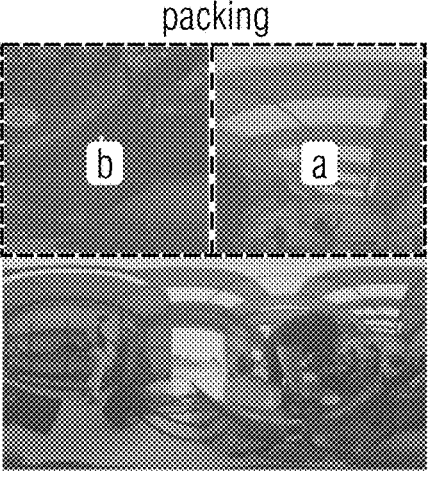

While the example from FIG. 4 illustrates the case where all tiles (high and low resolution) cover the entire 360-degree space and no tiles are repeatedly covering the same regions, another tile grouping can also be used as depicted in FIGS. 5A to 5C. It defines the entire low resolution portion of the video as a "low resolution fallback" layer as indicated in FIG. 5B, which can be merged with high-resolution tiles of FIG. 5A covering a subset of 360-degree video. The entire low resolution fallback video can be encoded as a single tile as indicated in FIG. 5C, while the high resolution tiles are rendered as an overlay of the low resolution part of the video at the final stage of rendering process.

Figures 6A, 6B, 7A, 7B, 8:
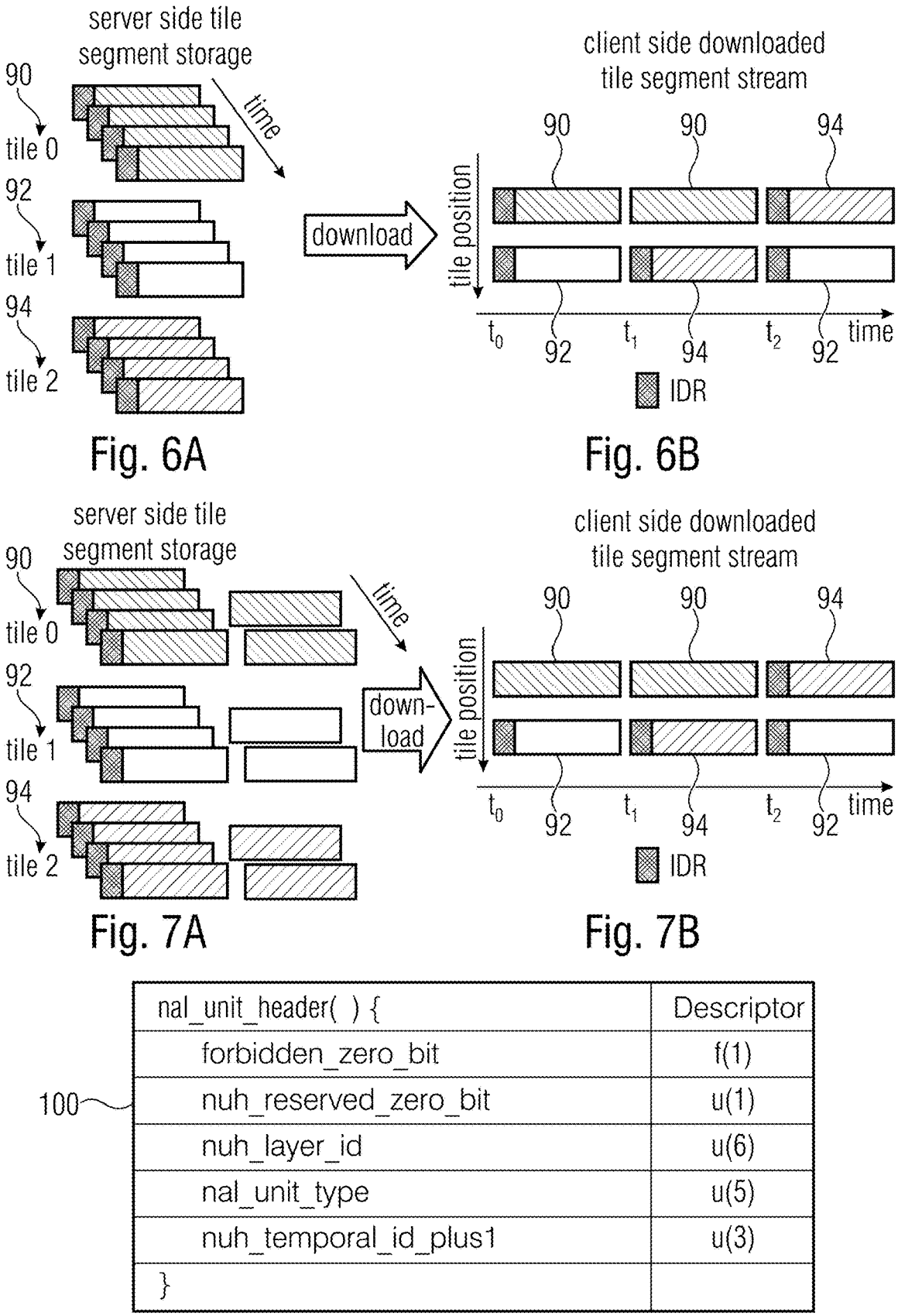
FIGS. 6A and 6B show a schematic illustration indicating an example of tile selection in tile based streaming.
FIGS. 7A and 7B show a schematic illustration indicating another example of tile selection in tile based streaming with unequal RAP (Random Access Point) period per tile.
FIG. 8 shows a schematic diagram indicating an example of NAL (Network Adaptive Layer) unit header according to embodiments of the present application.

A client starts a streaming session according to his tile selection by downloading all desired tile tracks as illustrated in FIGS. 6A and 6B, where a client commences the session with tile 0 indicated by a reference numeral 90 and tile 1 indicated by a reference numeral 92 in FIG. 6A. Whenever a viewport change occurs (i.e. user turns his head to look another way), the tile selection is changed at the next occurring temporal segment, i.e. tile 0 and tile 2 indicated by a reference numeral 94 in FIG. 6A and at the next available segment, the client changes position of tile 2 and replaces tile 0 with tile 1 as indicated in FIG. 6B. It is of importance to note that all segments need to begin with an IDR (Instantaneous Decoder Refresh) picture, i.e. a prediction-chain-resetting pictures, as for any new tile selection and positional change of tiles, will otherwise cause prediction mismatches, artifacts and drift.

Encoding each segment with an IDR picture is costly in terms of bitrate. Segments can potentially be very short in duration, e.g. to react quickly to orientation changes, which is why it is desirable to encode multiple variants with varying IDR (or RAP: Random Access Point) period as illustrated in FIGS. 7A and 7B. For instance, as indicated in FIG. 7B, at time instance $t_1$, there is no reason to break the prediction chain for tile 0 as the tile 0 has already been downloaded for time instance to and was placed at the same position which is why a client can choose a segment not starting with a RAP that's available at the server.

However, one issue remaining is that slices (tiles) within a coded picture are to obey certain constraints. One among them is that a picture may not contain NAL (Network Abstract Layer) units of RAP and non-RAP NAL unit types at the same time. Hence, for applications only two less desirable options exist to address the above issue. First, clients can rewrite the NAL unit type of RAP pictures when they are merged with non-RAP NAL units into a picture. Second, servers can obscure the RAP characteristic of these pictures by using non-RAP from the start. However, this hinders detection of RAP characteristics in systems that are to deal with these coded videos, e.g. for a file format packaging.

The invention is a NAL unit type mapping, that allows mapping one NAL unit type to another NAL unit type through an easily rewritable syntax structure.

In one embodiment of the invention, a NAL unit type is specified as mappable and the mapped type is specified in a parameter set, e.g. as follows based on Draft 6 V14 of the VVC (Versatile Video Coding) specification with high-lighted edits.

FIG. 8 shows a NAL unit header syntax. The syntax nal_unit_type,i.e. identifier 100, specifies the NAL unit type, i.e., the type of RBSP (row byte sequence payloads) data structure contained in the NAL unit as specified in the table indicated in FIG. 9.

The variable NalUnitType is defined as follows:
When nal_unit_type!=MAP_NUT
NalUnitType is equal to nal_unit_type
Otherwise (nal_unit_type==MAP_NUT)
NalUnitType is equal to mapped_nut
All references to the syntax element nal_unit_type in the specification are replaced with references to the variable NalUnitType, e.g. as in the following constraint:
The value of NalUnitType shall be the same for all coded slice NAL units of a picture. A picture or a layer access unit is referred to as having the same NAL unit type as the coded slice NAL units of the picture or layer access unit. That is, as depicted in FIG. 9, a first subset of coding unit types 102 indicates "nal_unit_type" 12, i.e., "MAP_NUT" and "VCL" as NAL unit type class. Therefore, a second subset of coding unit types 104 indicates "VCL" as NAL unit type class, i.e., all the coded slice NAL units of a picture, as indicated by the identifier 100 number 0 to 15, have the same NAL unit type class of the coding unit type of the first subset of coding unit types 102, i.e., VCL.

FIG. 10 shows a sequence parameter set RBSP syntax including mapped_nut, as indicated by the reference sign 106, which indicates that the NalUnitType of NAL units with nal_unit_type equal to MAP_NUT.

In another embodiment, that mapped_nut syntax element is carried in the access unit delimiter, AUD.

In another embodiment, it is a requirement of bitstream conformance that the value of mapped_nut must be a VCL NAL unit type.

In another embodiment, the mapping of the NalUnitType of NAL units with nal_unit_type equal to MAP_NUT is carried out by a profiling information. Such a mechanism could allow to have more than a NAL unit Type that is mappable instead of having a single MAP_NUT and indicate within a simple profiling mechanism or a single syntax element mapped_nut_space_idc the required interpretation of the NALUnitTypes of the mappable NAL units.

In another embodiment, the mapping mechanism is used to extend the value range of NALUnitTypes currently limited to 32 (since it is a u(5), e.g., as indicated in FIG. 10). The mapping mechanism could indicate any unlimited value as long as the number of NALUnitTypes required does not exceed the number of values reserved for mappable NAL units.

In one embodiment, when a picture simultaneous contains slices of the substitute coding unit type and slices of the regular coding unit types (e.g. existing NAL units of the VCL category), the mapping is carried out in a fashion that results in all slices of the picture having effectively the same coding unit type properties, i.e. the substitute coding unit type is equal to the coding unit type of the non-substitute slices of the regular coding types. In addition, the above embodiment holds true only for pictures with random access properties or for pictures without random access properties.

In addition to the described issues regarding NAL unit types in merging scenarios and NAL unit type extensibility and corresponding solutions, there exist several video applications in which information related to the video and how the video has been encoded is required for system integration and transmission or manipulation, such as on-the-fly adaptation.

There is some common information that has been established within the last years that are broadly used in industry and are clearly specified and specific bit values are used for such purpose. Examples thereof are:

Temporal ID at the NAL unit header

NAL unit types, including IDR, CRA, TRAIL, . . . or SPS (Sequence Parameter Set), PPS (Picture Parameter Set), etc.

However, there are several scenarios in which additional information could be helpful. Further types of NAL units that are not broadly used but have found in some cases some usefulness, e.g. BLA, partially RAP NAL units for sub-pictures, sub-layer non-reference NAL units, etc. Some of those NAL unit types could be implemented if the extensibility mechanism described above is used. However, another alternative is to use some fields within the slice headers.

In the past, additional information has been reserved at slice headers that are used for an indication of a particular characteristic of a slice:

discardable flag: specifies that the coded picture is not used as a reference picture for inter prediction and is not used as a source picture for inter-layer prediction.

cross_layer_bla_flag: affects the derivation of output pictures for layered coding, where picture preceding the RAP at higher layers might not be output.

A similar mechanism could be envisioned for upcoming video codec standards. However, one limitation of those mechanisms is that the defined flags occupy a particular position within the slice header. In the following the usage of those flags in HEVC is shown in FIG. 11.

As seen above the problem of such a solution is that the position of the extra slice header bits are assigned progressively and for applications that use a more seldom information the flag would come at a later position probably, increasing the number of bits that need to be send in the extra bits (e.g., "discardable_flag" and "cross_layer_bla_flag" in case of HEVC).

Alternatively, following a similar mechanism as described for the NAL unit types, the mapping of the flags in the extra slice header bits in the slice header could be defined at parameter sets. An example is shown as FIG. 12.

FIG. 12 shows an example of a sequence parameter set including a map to indicate association information using "extra_slice_header_bits_mapping_space_idc", i.e., a map, as indicated by the reference sign 200, which indicates the mapping space for the extra bits in the slice header.

FIG. 13 shows the mapping of the bits to the flags present indicated by "extra_slice_header_bits_mapping_space_idc" 200 of FIG. 12. As depicted in FIG. 13, binary characteristics 202 describes in a manner redundant with corresponding data in the predetermined video coding unit. In FIG. 13, three binary characteristics 202, i.e., "0", "1" and "2" are depicted. The number of the binary characteristics could be varied depending on the number of flags.

In another embodiment, that mapping is carried out in a syntax structure (e.g. as depicted in FIG. 14) that indicates the presence of a syntax element in the extra bits in the slice header (e.g. as depicted in FIG. 11). That is, for example, as depicted in FIG. 11, a condition on a presence flag controls the presence of a syntax element in the extra bits in the slice header, i.e., "num_extra_slice_header_bits>i" and ";i<num_extra_slice_header_bits; i++". In FIG. 11, each syntax element in the extra bits is placed at a particular position in the slice header as explained above, however, in this embodiment, it is not necessary that the syntax element, e.g., "discardable_flag", "cross_layer_bla_flag", or "slice_reserved_flag[i]", occupies the particular position. Instead, when a first syntax element (e.g. "discardable_flag" in FIG. 11) is indicated to not be present when checking the condition on the value of the particular presence flag (e.g. "discardable_flag_present_flag" in FIG. 14), a following second syntax element takes position of the first syntax element in the slice header when present. Also, the syntax element in the extra bits could be present in the picture header by indicating the flag, e.g., "sps_extra_ph_bit_present_flag [i]". In addition, the syntax structure, for example, a number of syntax elements, i.e., the number of presented flags, indicates the existence/presence of particular characteristics or a number of presented syntax element in the extra bits. That is, the number of presented particular characteristics or syntax elements in the extra bits is indicated by counting how many syntax elements (flags) are presented. In FIG. 14, the presence of each syntax element is indicated by the flags 210. That is, each flag in 210 indicates the presence of slice header indication for particular characteristics of the predetermined video coding unit. In addition, a further syntax "[ . . . ]//further flags" as indicated in FIG. 14 and corresponding to the "slice_reserved_flag[i]" syntax elements in the slice header of FIG. 11 is used as a place holder indicating the existence/presence of a syntax element in the extra bit or used as indication of the existence/presence of further flags.

In another embodiment, the flag type mapping is signaled per each extra slice header bit in a parameter set, e.g. as shown in FIG. 15. As indicated in FIG. 15, a syntax "extra_slice_header_bit_mapping_idc", i.e., the map 200, is signaled in the sequence parameter set and indicates the location of the mapped characteristics.

FIG. 16 shows the mapping of the bits to the flags present indicated by "extra_slice_header_bits_mapping_space_idc" of FIG. 15. That is, binary characteristics 202 corresponding to the map 200 indicated in FIG. 15 are depicted in FIG. 16.

In another embodiment, the slice header extension bits are replaced by an idc signaling that represents a certain flag value combination, e.g. as shown in FIG. 17. As depicted in FIG. 17, the map 200, i.e., "extra_slice_header_bit_idc", is indicated in the slice segment header, i.e., the map 200 indicates the presence of the characteristics as shown in FIG. 18.

FIG. 18 shows that the flag values, i.e., binary characteristics 202, represented by a certain value of "extra_slice_header_bit_idc" are either signalled in a parameter set or pre-defined in the specification (known apriori).

In one embodiment, the value space of "extra_slice_header_bit_idc", i.e., the value space for the map 200, is divided into two ranges. One range representing flag value combinations known apriori and one range representing flag value combinations signalled in the parameter sets.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the application can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present application can be implemented as a computer program product with a program code, the program code being operative for performing one of the methods when the computer program product runs on a computer. The program code may, for example, be stored on a machine readable carrier.

Other embodiments comprise a computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may, for example, be configured to be transferred via a data communication connection, for example via the internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The invention claimed is:

1. A video decoding apparatus comprising:
processing circuitry configured to perform operations comprising:
receiving, from a video data stream, a sequence parameter set (SPS);
parsing, from the SPS, an extra slice header bit map;
mapping one or more bits in the extra slice header bit map to one or more flags that indicate presence or non-presence corresponding to a syntax element in a slice header;
determining a number of extra slice header bits based on an amount of the one or more flags that indicate presence; and
parsing, from the video data stream, the syntax element in the slice header based on the determined number of extra slice header bits.

2. The video decoding apparatus of claim 1, the operations further comprising:
determining, based on the determined number of extra slice header bits, a position of the syntax element in the slice header.

3. The video decoding apparatus of claim 1, the operations further comprising:
determining, based on the determined number of extra slice header bits, a position of a second syntax element in the slice header.

4. The video decoding apparatus of claim 1, wherein the amount of the one or more flags that indicate presence is determined based on counting how many of the one or more flags indicate presence.

5. The video decoding apparatus of claim 1, wherein each of the one or more flags comprises a one-bit value.

6. A method of video decoding comprising:
receiving, from a video data stream, a sequence parameter set (SPS);
parsing, from the SPS, an extra slice header bit map;
mapping one or more bits in the extra slice header bit map to one or more flags that indicate presence or non-presence corresponding to a syntax element in a slice header;
determining a number of extra slice header bits based on an amount of the one or more flags that indicate presence; and
parsing, from the video data stream, the syntax element in the slice header based on the determined number of extra slice header bits.

7. The method of claim 6, further comprising:
determining, based on the determined number of extra slice header bits, a position of the syntax element in the slice header.

8. The method of claim 6, further comprising:
determining, based on the determined number of extra slice header bits, a position of a second syntax element in the slice header.

9. The method of claim 6, wherein the amount of the one or more flags that indicate presence is determined based on counting how many of the one or more flags indicate presence.

10. The method of claim 6, wherein each of the one or more flags comprises a one-bit value.

11. A non-transitory computer-readable medium comprising instructions, which when executed by processing circuitry, perform the method of claim 6.

12. A method of video encoding comprising:
providing, via a video data stream, a sequence parameter set (SPS);

encoding, in the SPS, an extra slice header bit map that maps one or more bits in the extra slice header bit map to one or more flags that indicate presence or non-presence corresponding to a syntax element in a slice header;

determining a number of extra slice header bits based on an amount of the one or more flags that indicate presence; and providing, via the video data stream, the syntax element in the slice header based on the determined number of extra slice header bits.

13. The method of claim 12, further comprising:

determining, based on the determined number of extra slice header bits, a position of the syntax element in the slice header.

14. The method of claim 12, further comprising:

determining, based on the determined number of extra slice header bits, a position of a second syntax element in the slice header.

15. The method of claim 12, wherein the amount of the one or more flags that indicate presence is determined based on counting how many of the one or more flags indicate presence.

16. The method of claim 12, wherein each of the one or more flags comprises a one-bit value.

17. A non-transitory computer-readable medium comprising instructions, which when executed by processing circuitry, perform the method of claim 12.

18. A video encoding apparatus comprising:

processing circuitry configured to perform the method of claim 12.

* * * * *